United States Patent [19]

Suda et al.

[11] 3,855,195

[45] Dec. 17, 1974

[54] METHOD FOR PRODUCING PURE M-CRESOL

[75] Inventors: Hideaki Suda, Takaishi; Iwao Dohgane, Nishinomiya; Hirokazu Hosaka, Minoo; Kazunari Ebara, Takarazuka, all of Japan

[73] Assignee: Sumitomo Chemical Company, Limited, Osaka, Japan

[22] Filed: July 22, 1971

[21] Appl. No.: 165,364

[30] Foreign Application Priority Data
July 22, 1970 Japan............................... 45-64636
Dec. 8, 1970 Japan............................... 45-10997
Dec. 8, 1970 Japan............................... 45-10998

[52] U.S. Cl............................................. 260/96.5 C
[51] Int. Cl............................................. C07b 21/00
[58] Field of Search...... 260/96.5 U, 96.5 C, 96.5 R

[56] References Cited
UNITED STATES PATENTS
1,830,859  11/1931  Schotte et al................. 260/96.5 U
FOREIGN PATENTS OR APPLICATIONS
1,191,631  5/1970  Great Britain................. 260/96.5 C

*Primary Examiner*—Leon Zitver
*Assistant Examiner*—Norman P. Morgenstern
*Attorney, Agent, or Firm*—Stewart and Kolasch, Ltd.

[57] ABSTRACT

In a method for recovery of m-cresol from its mixture with at least one material which is not reacted with urea which comprises treating the said mixture with urea at a lower temperature to form a molecular compound of m-cresol and urea, separating the molecular compound from the resulting mixture, decomposing the molecular compound at a higher temperature to m-cresol and urea and separating m-cresol from the resultant mixture, an improvement that at least one of the steps of formation and the decomposition of the molecular compound is carried out in a solvent selected from the group consisting of benzenes substituted or not with 1 to 3 alkyl groups of 1 to 4 carbon atoms and/or 1 or 2 halogen atoms, dialkyl ethers of which the alkyl moiety has 2 to 5 carbon atoms and cyclic ethers having 4 or 5 carbon atoms, whereby m-cresol is recovered quantitatively in a highly pure state.

12 Claims, No Drawings

METHOD FOR PRODUCING PURE M-CRESOL

The present invention relates to a method for producing pure m-cresol. More particularly, it relates to a method for recovering m-cresol quantitatively in a pure state from its mixture with a material which is not reacted with urea.

Hitherto, it has been known that the treatment of m-cresol with urea can afford a molecular compound consisting of 1 mol of m-cresol and 1 mol of ureak which urea, quite different from the so-called "urea adduct" obtained from a compound having a straight carbon chain and urea.

The said molecular compound is readily decomposed to m-cresol and urea at an elevated temperature. Utilizing such characteristic property, there has been proposed a method for recovery of m-cresol from its mixture with a material which is not reacted with urea, which comprises treating the said mixture with urea at a lower temperature to form a molecular compound of m-cresol and urea, separating the molecular compound from the resulting mixture, decomposing the molecular compound at a higher temperature to m-cresol and urea and separating m-cresol from the resultant mixture.

In the above conventional method, the formation of the molecular compound is carried out by treating a m-cresol containing mixture with urea in a solid phase or in an aqueous solution at a reduced temperature. The yield of the molecular compound in the solid phase reaction at a relatively high temperature is not good. When effected at a relatively low temperature, the yield is increased but the reaction mixture becomes viscous so that the separation of the molecular compound from the reaction mixture encounters great difficulty. In case of the reaction in an aqueous solution, a certain limit exists in lowering the reaction temperature because of using water and the reaction is necessarily performed at a relatively high temperature so that the yield of the molecular compound is inferior.

On the other hand, the decomposition of the molecular compound according to the said conventional method is carried out by heating the molecular compound in the absence of any solvent or treating the molecular compound with water or dilute mineral acid at an elevated temperature. In the former procedure, however, the separation of m-cresol from the decomposition product is difficult and the decomposition of m-cresol and urea themselves proceeds simultaneously. In the latter procedure, the recovery of urea from the resulting solution is required, and this is disadvantageous from the industrial viewpoint. Moreover, m-cresol is dissolved in the used solvent to a certain extent so that the recovery efficiency is decreased considerably.

It has now been found that, when at least one of the formation and decomposition of the steps of molecular compound in the said method is carried out in a certain specific solvent, the recovery of m-cresol can be accomplished in a high efficiency with ease. The present invention is based on this finding.

Although, according to the present invention, at least one of the steps of formation and the decomposition of the molecular compound may be effected in unsubstituted benzenes or benzenes having or not 1 to 4 alkyl groups of 1 to 3 carbon atoms and/or 1 or 2 halogen atoms on the benzene ring (e.g. benzene, toluene, xylene, isopropyltoluene, chlorobenzene), dialkyl ethers of which the alkyl moiety has 2 to 5 carbon atoms (e.g. diethyl ether, dipropyl ether) and cyclic ethers having 4 or 5 carbon atoms (e.g. tetrahydrofuran, dioxane) [hereinafter referred to as "effective solvent"], the most preferred procedure is to carry out both of these steps in the presence of the said effective solvent. Therefore, the method of this invention will be hereinafter illustrated on such preferred feature.

In the first step of the method of this invention, a mixture of m-cresol with at least one material which is not reacted with urea is treated with urea in the effective solvent. The content of m-cresol in the mixture is not less than 20% by weight. Urea is normally employed in an equimolar to three molar amount to one mole of m-cresol. The effective solvent is ordinarily used in a half to three time amount by weight of urea. Particularly preferred effective solvents include benzene, toluene, xylene, isopropyltoluene and chlorobenzene. The treatment is normally effected at a temperature from −20° to 80°C, preferably from −10°C to room temperature, for a sufficient period of time until the reaction reaches an equilibrium. The reaction time mainly depends upon the reaction temperature, and usually the treatment is conducted for 5 minutes to 30 hours, preferably 2 to 3 hours.

After the formation of the molecular compound as a solid is accomplished, it is separated from the reaction mixture in a slurry state by a per se conventional procedure (e.g. contrifugation, decantation, filtration).

The thus collected molecular compound is then decomposed to m-cresol and urea by treatment at an elevated temperature in the effective solvent. The amount of the effective solvent may be from a half to 10 time amount by weight, preferably a 1 1/5 to 5 time amount by weight, of the molecular compound. When the amount is smaller, the mixture becomes viscous and the decomposition is considerably prevented. Specific examples of the particularly preferred effective solvents are benzene, toluene, xylene, isopropyltoluene, chlorobenzene, diethyl ether, tetrahydrofuran and dioxane. The treatment is usually effected at a temperature from room temperature to the boiling point of the mixture, favorably from 60° to 80°C. The temperature is mostly associated with the kind of the effective solvent and, when the same solvent as in the formation step is used, a higher temperature is required for this decomposition step. The decomposition is normally attained within 5 minutes to 2 hours at the said favorable range of temperature.

After the decomposition is completed, m-cresol is dissolved in the employed effective solvent, whereas urea is separated out as a solid. Therefore, the application of a simple operation conventionally employed for separation of a solid material and a liquid material to the resulting mixture can afford a solution of m-cresol in the employed effective solvent.

Removal of the effective solvent from the resultant solution by a per se conventional procedure such as distillation affords m-cresol in a high purity. When desired, the recovered m-cresol may be further purified by a per se conventional procedure such as distillation.

Compared with the conventional one, the method of this invention is advantageous in the recovery of m-cresol in a high purity and a quantitative yield. It is also advantageous that the separation of the molecular compound and the m-cresol containing solution from their slurry mixture respectively in the formation step and the decomposition step can be performed with facility even at a relatively low temperature so that any special and expensive equipment is not needed in such separation. It is further advantageous that the urea separated from the m-cresol containing solution at the final step contains m-cresol only in the amount of 0.1% by weight or less and can be used repeatedly as such.

Practical and presently preferred embodiments of the present invention are illustratively shown in the following Examples wherein % are by weight.

EXAMPLE 1

A mixture of 65% of m-cresol and 35% of p-cresol (100 kg) is admixed with toluene (50 kg), and industrial urea (45 kg) is added thereto at 30°C while stirring. The resultant slurry mixture is cooled to −10°C and subjected to centrifugation. The obtained cake is, after being washed with toluene (20 kg) cooled to −10°C, added to toluene (150 kg). The mixture is stirred at 80°C for 10 minutes and filtered while warming to recover urea (43 kg). The filtrate is concentrated to remove toluene and then distilled to give pure m-cresol (58 kg). The recovered urea can be used again.

EXAMPLE 2

A mixture of 35% of m-cresol and 65% of p-cresol (100 kg) is admixed with chlorobenzene (10 kg), and urea (18 kg) is added thereto at 50°C while stirring. The resultant mixture is cooled to 0°C and subjected to centrifugation. The obtained cake is, after being washed with chlorobenzene (7 kg) cooled to 0°C, added to chlorobenzene (120 kg). The mixture is stirred at 30°C for 1 hour and filtered to recover urea. The filtrate is concentrated to remove chlorobenzene and distilled to give pure m-cresol (18 kg).

EXAMPLE 3

A mixture (100 kg) of 70% of m-cresol, 10% of p-cresol, 10% of styrene and 10% of acetophenone is admixed with isopropyltoluene (30 kg), and the urea recovered in Examples 1 and 2 (50 kg) is added thereto at 20°C while stirring. The resultant mixture is slowly cooled to 5°C, and stirring is continued for 1 hour. The reaction mixture is filtered, and the obtained cake is, after being washed with cooled isopropyltoluene (30 kg), added to isopropyltoluene (70 kg). The mixture is heated at 110°C for 5 minutes while stirring and then filtered to recover urea (47 kg). The filtrate is concentrated to remove isopropyltoluene and distilled to give pure m-cresol (50 kg).

EXAMPLE 4

The molecular compound (16.8 kg) consisting of m-cresol and urea is admixed with toluene (25.2 kg), and the resultant mixture is heated at 100°C for 5 minutes while stirring. The reaction mixture is filtered while warming to recover urea (5.7 kg). The filtrate is concentrated to remove toluene and distilled to give pure m-cresol (10.5 kg). The recovered urea can be used again.

EXAMPLE 5

To a mixture (36 kg) of urea and the molecular compound of m-cresol and urea (the weight ratio of m-cresol and urea in the mixture being 3:7), chlorobenzene (100 kg) is added, and the resultant mixture is stirred at 60°C for 20 minutes. The reaction mixture is filtered to recover urea (25 kg). The filtrate is concentrated to remove chlorobenzene and distilled to give pure m-cresol (10.5 kg).

EXAMPLE 6

To a mixture (3.6 kg) of urea and the molecular compound consisting of m-cresol and urea (the weight ratio of m-cresol and urea in the mixture being 3:7), tetrahydrofuran (15 kg) is added, and the resultant mixture is stirred at room temperature for 30 minutes. The reaction mixture is allowed to stand for a while to precipitate urea, and the supernatant is taken out by decantation. The rest is filtered to recover urea (2.5 kg). The filtrate is combined with the supernatant, concentrated to remove tetrahydrofuran and distilled to give pure m-cresol (1.1 kg).

What is claimed is:

1. In a method for the recovery of m-cresol from a mixture consisting essentially of m-cresol and p-cresol which comprises treating the said mixture with urea to form a solid molecular compound of m-cresol and urea, separating the molecular compound from the resulting mixture, decomposing the molecular compound by heating to m-cresol and urea and separating m-cresol from the resultant mixture, the improvement wherein the formation of the molecular compound is carried out in a solvent selected from the group consisting of benzene, benzene substituted with 1 to 3 alkyl groups of 1 to 4 carbon atoms and/or 1 or 2 halogen atoms, dialkyl ethers of which the alkyl moiety has 2 to 5 carbon atoms, tetrahydrofuran and dioxane.

2. The method according to claim 1, wherein the solvent is a benzene substituted with 1 to 3 alkyl groups of 1 to 4 carbon atoms.

3. The method according to claim 1, wherein the formation of the molecular compound is effected at a temperature from −20° to 80°C for 5 minutes to 30 hours.

4. The method according to claim 1, wherein the solvent is used in an amount of ½ to 3 times the amount by weight of urea.

5. The method according to claim 1, wherein the urea is used in an equimolar to 3 times the molar amount per one mole of m-cresol.

6. The method according to claim 1, wherein said solvent is selected from the group consisting of benzene, toluene, xylene, isopropyltoluene, chlorobenzene, diethyl ether, tetrahydrofuran and dioxane.

7. In a method for the recovery of m-cresol from a mixture consisting essentially of m-cresol and p-cresol which comprises treating the said mixture with urea to form a solid molecular compound of m-cresol and urea, separating the molecular compound from the resulting mixture, decomposing the molecular compound by heating to m-cresol and urea and separating m-cresol from the resultant mixture, the improvement wherein the decomposition of the molecular compound is carried out in a solvent selected from the group consisting of benzene, benzene substituted with 1 to 3 alkyl groups of 1 to 4 carbon atoms and/or 1 or 2 halogen atoms, dialkyl ethers of which the alkyl moiety has 2 to 5 carbon atoms, tetrahydrofuran and dioxane.

8. The method according to claim 7, wherein the solvent is a member selected from the group consisting of benzene substituted with 1 or 2 halogen atoms, dialkyl ethers of which the alkyl moiety has 2 to 5 carbon atoms, tetrahydrofuran and dioxane.

9. The method according to claim 7, wherein the decomposition is effected at a temperature from room temperature to the boiling point of the mixture for 5 minutes to 2 hours.

10. The method according to claim 7, wherein the solvent is used in an amount of ½ to 10 times the amount by weight of the molecular compound.

11. The method according to claim 7, wherein said solvent is selected from the group consisting of benzene, toluene, xylene, isopropyltoluene, chlorobenzene, diethyl ether, tetrahydrofuran and dioxane.

12. In a method for the recovery of m-cresol from a mixture consisting essentially of m-cresol and p-cresol which comprises treating the said mixture with urea to form a solid molecular compound of m-cresol and urea, separating the molecular compound from the resulting mixture, decomposing the molecular compound by heating to m-cresol and urea and separating m-cresol from the resultant mixture, the improvement wherein the formation and the decomposition of the molecular compound is carried out in a solvent selected from the group consisting of benzene, benzene substituted with 1 to 3 alkyl groups of 1 to 4 carbon atoms and/or 1 or 2 halogen atoms, dialkyl ethers of which the alkyl moiety has 2 to 5 carbon atoms, tetrahydrofuran and dioxane.

* * * * *